United States Patent [19]

Clare

[11] Patent Number: 5,567,000
[45] Date of Patent: Oct. 22, 1996

[54] HIDDEN STORAGE/UTILITY SYSTEM

[76] Inventor: Scott Clare, 3381 Shawn Ct., Hayward, Calif. 94541

[21] Appl. No.: 506,893

[22] Filed: Jul. 26, 1995

[51] Int. Cl.⁶ .................................................. B60R 11/06
[52] U.S. Cl. ........................................ 296/37.6; 296/183
[58] Field of Search ................... 296/24.1, 37.1, 296/37.6, 181, 183; 224/402, 403, 404

[56] References Cited

U.S. PATENT DOCUMENTS

| | | | |
|---|---|---|---|
| 1,490,657 | 4/1924 | Botella | 296/37.1 |
| 1,990,757 | 2/1935 | Stiles | 296/37.1 X |
| 2,455,417 | 12/1948 | Holan et al. | 296/37.6 X |
| 2,722,352 | 11/1955 | Dehnel | 296/37.6 X |
| 2,978,153 | 4/1961 | Brindle | 296/37.6 X |
| 3,245,713 | 4/1966 | Ogilvie | 296/37.6 X |
| 3,326,595 | 6/1967 | Ogilvie | 296/37.6 |
| 3,727,971 | 4/1973 | Sisler | 296/37.6 |
| 4,685,695 | 8/1987 | LeVee | 296/37.6 X |
| 4,705,317 | 11/1987 | Henri | 296/37.6 |
| 4,789,195 | 12/1988 | Fletcher | 296/37.6 |
| 4,917,430 | 4/1990 | Lawrence | 296/37.6 |
| 5,267,773 | 12/1993 | Kalis, Jr. et al. | 296/183 |
| 5,303,969 | 4/1994 | Simnacher | 296/37.6 |

*Primary Examiner*—Andrew C. Pike
*Attorney, Agent, or Firm*—L. E. Carnahan

[57] ABSTRACT

A pickup truck conversion and method of providing same involves a storage/utility system in any fleet size pickup truck bed without substantially altering the bed's external appearance. The storage system is located adjacent the wheel well sections of the bed, and uses hinges to open and close the fender (side panel) of the bed. Since the storage system does not substantially alter the truck's external appearance, it reduces the attraction for theft. Also, since the storage area does not extend inwardly beyond the cenventional wheel wells, the storage system leaves most of the truck bed free for use.

16 Claims, 2 Drawing Sheets

HIDDEN STORAGE/UTILITY SYSTEM

BACKGROUND OF THE INVENTION

The present invention relates to pickup trucks, particularly to storage/utility beds for pickup trucks, and move particularly to a storage/utility conversion and method of providing same in a conventional pickup bed without altering the external appearance of the bed.

Pickup trucks have long been a means for transporting and/or storing tools, materials, etc. for various trades, such as plumbing, electrical, construction, repair, etc. While conventional tool boxes, which generally extend across the pickup bed, are a convenient tool storage approach, such take up a great deal of space and thus reduce the carrying capacity. Also, the conventional pickup beds have been removed and replaced with utility type beds of various types, such as exemplified by U.S. Pat. No. 5,267,773 issued Dec. 7, 1993 to G. Kalis, Jr. et al. In addition, the pickup truck body and/or beds have been modified to provide storage/utility space, such as exemplified by U.S. Pat. No. 4,917,430 issued Apr. 17, 1990 to M.A. Lawrence.

While these prior storage/utility arrangements have been satisfactory for their intended purpose, such are an attraction for theft as well as having an appearance of a utility bed. Thus, there has been a need for a storage/utility system for pickup truck beds which does not alter the bed's external appearance or significantly reduce the interior size of the bed, thereby reducing the tool theft problem while providing space for hidden storage without significant reduction of the bed's carrying capacity.

This need has been filled by the present invention which involves the conversion of a conventional pickup truck bed into a storage/utility bed without altering the external appearance of the bed and without significant reduction in the carrying capacity thereof. This is accomplished by providing storage adjacent the wheel well area, and along the length of the bed, and providing the fender/side panel of the bed with a hinge and latch arrangement whereby the fender/side panel can be raised to expose the storage area, or closed and latched to conceal the storage area. Thus, the pickup can be used for pleasure or work without the appearance of its storage/utility capability, and can be parked in areas where theft would likely occur from conventional tool boxes or utility

SUMMARY OF THE INVENTION

It is an object of the present invention to provide a storage/utility system for conventional pickup truck beds.

A further object of the invention is to provide a method for converting a standard pickup truck bed into a storage/utility bed.

A further object of the invention is to provide a pickup truck bed with storage/utility capability without a significant reduction in the carrying capacity thereof.

Another object of the invention is to provide a pickup bed with storage/utility capability without altering the external appearance of the bed.

Another object of the invention is to provide a pickup bed with a hidden storage/utility system wherein the fender/side panel of the bed is hinged to al low access to the storage/utility area.

Another object of the invention is to reduce theft potential from a storage/utility bed of pickup trucks, etc. by providing hidden storage/ utility areas in the bed without altering the external appearance of the bed.

Other objects and advantages of the invention will become apparent from the following description and accompanying drawings. The invention involves a storage/utility system for pickup truck beds that can be installed in any fleet side bed without altering the bed's appearance. The storage/utility system is installed in the wheel well area of the bed, and uses hinges to open and close the fender/side panel of the bed. The fender/side panel is provided with a latching and lock mechanism. Since the storage/utility system only involves the area of bed adjacent the wheel wells, it dos not significantly reduce the carrying capacity of the bed. By providing a hidden storage/utility system for a pickup truck bed, the potential of theft therefrom is substantially reduced since the unaltered appearance of the bed's external surfaces would not lead one to a realization that it contained tools, etc.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention involves a storage/utility system for a pickup truck bed and a method for conversion of a conventional pickup truck bed to a storage/utility bed without altering the external appearance of the bed, and without a significant reduction in the carrying capacity of the bed. The present invention reduces the theft potential from storage/utility beds by eliminating the appearance of such beds. The invention utilizes lost space adjacent the wheel wells of the bed while maintaining the space between the wheel wells. As known, the space between the wheel wells of a conventional pickup truck bed is slightly over four (4) feet and the conventional pickup truck beds have a length of eight (8) feet plus, wherein sheets of 8 ft. by 4 ft. material, such as plywood, etc. can be carried between the wheel wells. However, the space in front and back of the wheel well is generally considered lost space for large items until material bas been stacked above the height of the wheel wells. Thus, by utilizing the area in front, back, and above the wheel wells as storage/utility space, the overall storage/carrying capacity of the bed is increased between the outer fender and inner fender of a stock pickup by removing the inner fender. Here, the term storage/utility space is defined as that space in which tools, such as vices, saws, etc. can be stored or mounted for use, and in which shelves can be secured for retaining parts, etc.

Figure 1:
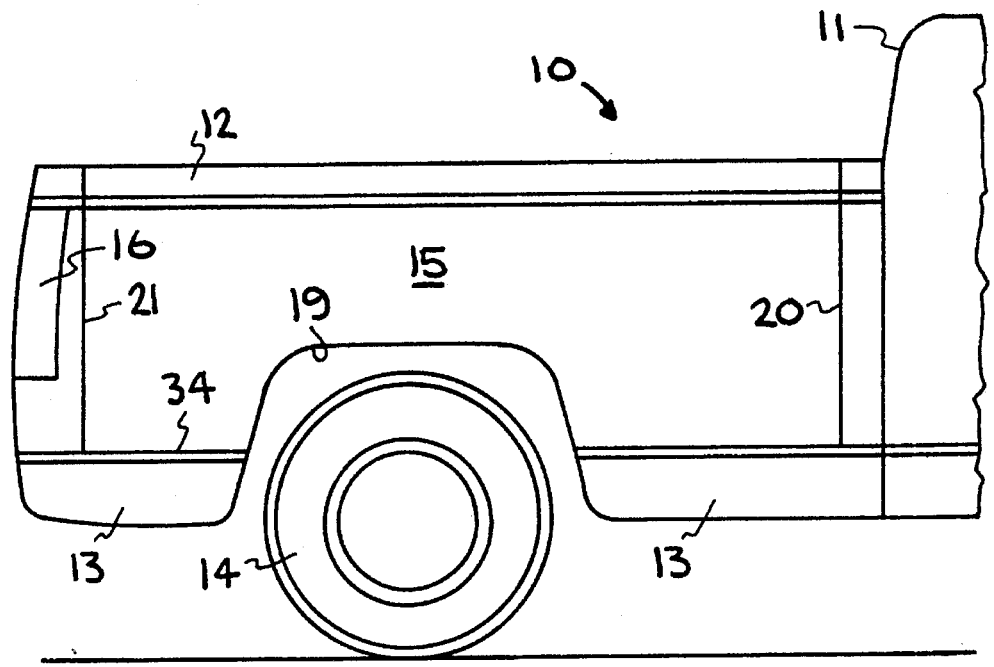
FIG. 1 is a view of a side of a pickup truck bed which has been modified to incorporate the storage/utility system under the closed fender/side panel of the bed in accordance with the present invention.

By the present invention, a conventional pickup truck bed is converted to a storage/utility bed, whereas the conventional installation of storage/utility beds involve the replacement of the conventional bed, thus the cost of conversion compared to the cost of the conventional bed replacement is substantially less. Basically, the conversion involves cutting each fender/side panel (hereinafter called side panel) vertically in two places and along the upper length thereof, on an inner surface of the side panel, as described in detail hereinafter, disconnecting the lower length of the side panels from the bed frame, hinging the side panel along the upper length, providing braces on the side panels, installing a latching mechanism along the lower length of the side panels, providing a key lock for the latching mechanism, installing a storage structure or box over the wheel wells along each side of the bed, securing shelving to the storage box, and painting the cut areas and the storage box to correspond to the color of the bed. Upon completion of the conversion, from a side view, the only difference between the converted bed and a nonconverted be are two vertical lines or small spaces, one just back of the front of the bed and one just forward of the taillight section of the bed, where the side panel is cut, as illustrated in FIG. 1. The hinge for each side panel is located on an inner area of the side panel so as not to be exposed to one viewing the bed from an external side position. Thus, one would not readily recognize the modification to the bed, and therefore those with intent to steal tools, etc. would not recognize the hidden storage arrangement.

Figure 2:
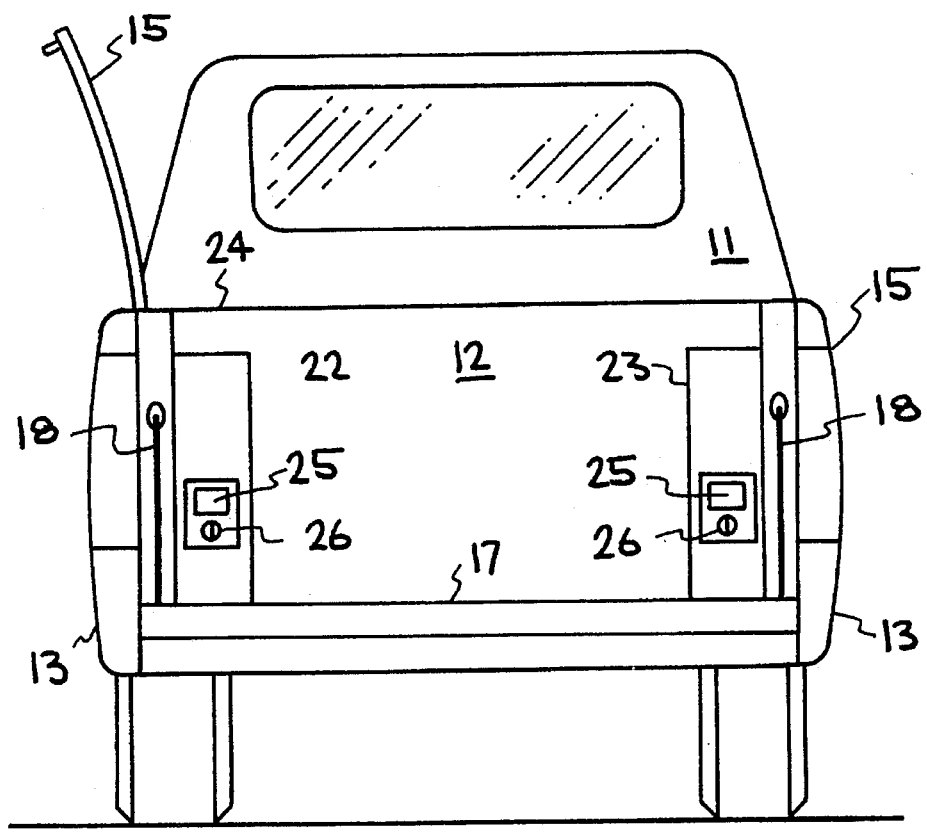
FIG. 2 is an end view of the pickup truck bed of FIG. 1 showing the left fender/side panel open, the right fender/side panel closed, the tail gate open, and the storage boxes and lock mechanism within the bed.

Referring now to the drawings, FIGS. 1 and 2 illustrate a conventionally appearing pickup truck generally indicated at 10 having a cab 11, bed 12, frame or undercarriage 13, and wheels 14. The bed 12 is mounted on frame or undercarriage 13 and includes side pannels 15, a taillight arrangement 16, a hinged tailgate 17 with stop mechanisms 18, and wheel wells 19. However, the bed 12 of FIGS. 1 and 2 has been modified in accordance with the present invention, with the only indication of such modification being the cuts, small spaces, or lines 20 and 21 in the side panels 15, as shown in FIG. 1, with the side panel being closed. Note that in this embodiment the side panels 15 terminate adjacent the frame or undrcarriage 13.

Figure 3:
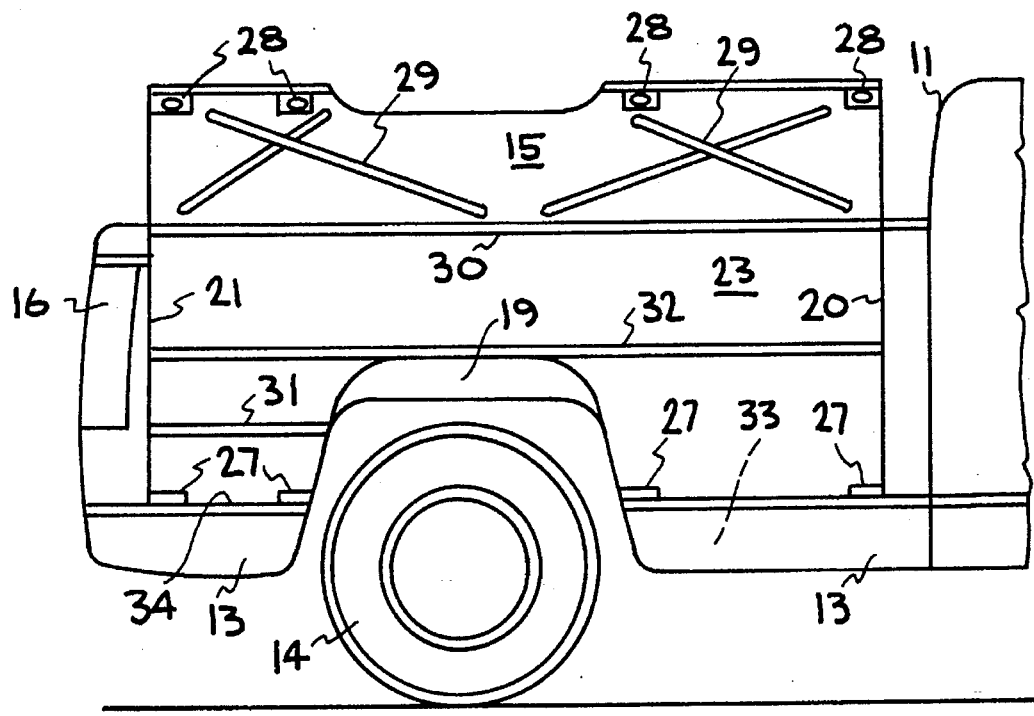
FIG. 3 is a view of an embodiment of the storage/utility system of the FIG. 1 pickup truck bed with the fender/side panel raised to illustrate the storage bin shelves and latch mechanism.
Figure 4:
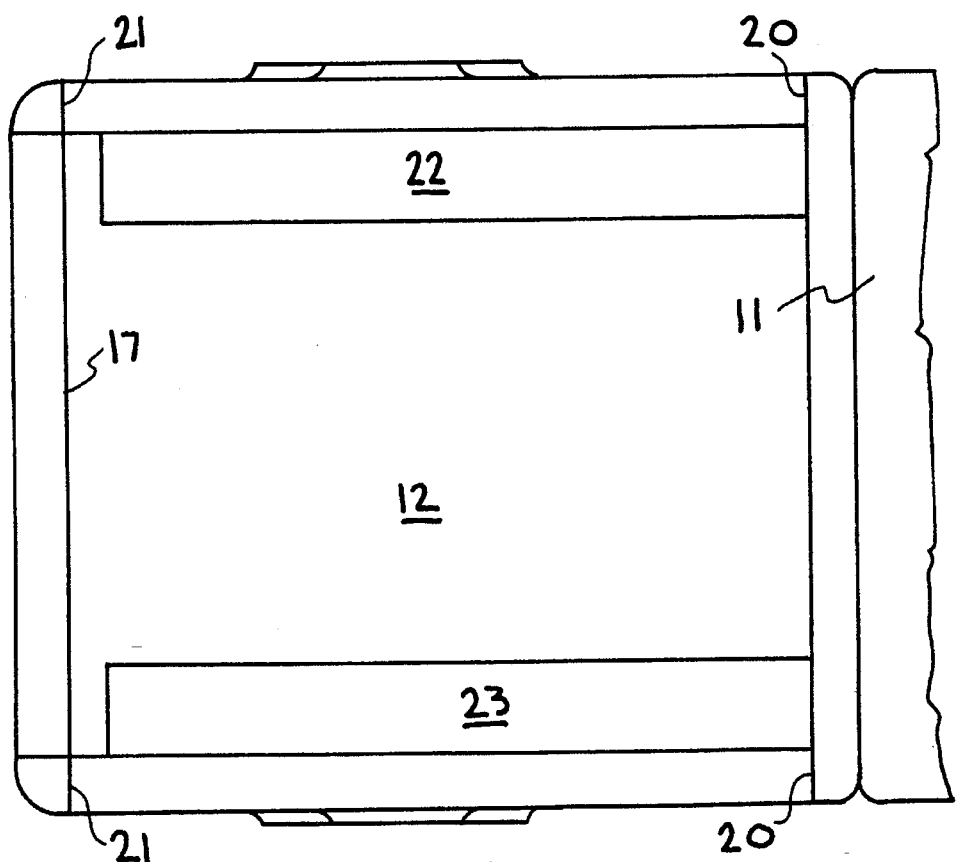
FIG. 4 is a top view of the FIG. 1 pickup truck bed illustrating the storage boxes and fender/side panels, with the tail gate closed.

As seen in FIGS. 2, 3, and 4, the storage/utility area is provided by storage or structure boxes 22 and 23 mounted within the bed 12 and over the wheel wells 19, the boxes 22 and 23 being constructed to cover the wheel wells 19, but not extend to the top or upper surface 24 of bed 12, and terminate in spaced relation to tailgate 17. A latch mechanism 25 is mounted in the rear of each of boxes 22 and 23, as seen in FIG. 2, and is provided with a key lock 26. The latch mechanism 25 includes latch members 27 located in spaced relation along the bed 12, and which cooperate with corresponding latch members 28 in side panel 15, as show in FIG. 3. While not shown, the latch members 27 are interconnected by a rod or cable which is connected to mechanism 25 which includes a release for members 27.

As seen in FIG. 3, the side panels 15 are each provided with braces 29 and a hinge 30 that extends the full length thereof. Shelves 31 and 32 are secured to the interior of storage or structure boxes 22 and 23, and the area forward of the wheel well 19 forms a storage bin 33. The hinges 30 are located on the interior of the bed 12 and thus not visible from the exterior.

It has thus been shown that the present invention provides a hidden storage/utility arrangement that can be initially built into a pickup truck bed, or a conventional bed can be converted to include the storage/utility arrangement without altering the external appearance of the bed and without a significant reduction in the carrying capacity of the bed. While the invention has been described with respect to a pickup bed, it can be readily incorporated into trailer or full-sized truck beds having side panels without detracting from the appearance of the side panels, except for the two vertical cuts therein.

While a specific embodiment of the storage/utility system of the present invention has been described and illustrated, such is not intended to limit the invention to this embodiment. For certain applications only one storage box my be desired. Beds for pickups, trailers, and trucks are designed with differently constructed side panels and frame/ undercarriage arrangements. For example, the bed 12 of FIG. 1 my extend downward to cover the frame or undercarriage 13, as shown, and thus the side panels 15 would include the extended area, or a cut, such as indicated at 34 in FIG. 2, can be made along a desired lower portion of the side panels to eliminate the need for raising the entire side panel when the extended area is part thereof.

Modifications and changes my become apparent to those skilled in the art, and it is intended that the scope of the invention be limited only by the scope of the appended claims.

What is claimed is:

1. A hidden storage/utility system for a bed without substantially altering an external appearance of overall side panels of the bed, and the bed being adapted to be mounted on wheels, said system comprisings:

a storage box mounted on at least one side of said bed and having side walls and end walls enclosing an interior;

at least a substantial portion of one said overall side panel on said at least one side of said bed comprising one said side wall of said storage box and being hinged horizontally at an upper portion therof, whereby said hinged side panel portion can be raised to expose the interior of said storage box and lowered to cover the interior of said storage box without substantially altering the external appearance of said one overall side panel; and a lock and latch mechanism mounted in one said end wall and said side panel portion to releasably secure said portion of said one overall side panel.

2. The storage/utility system of claim 1, wherein said bed includes a pair of wheel wells, and wherein said storage box covers one of said wheel wells and extends forward and rearward therefrom.

3. The storage/utility system of claim 2, wherein said storage box has a height less than a height of said bed.

4. The storage/utility system of claim 3, wherein said lock and latch mechanism is mounted to said storage box and includes a plurality of latch members adapted to cooperate with latch members secured to said one overall side panel.

5. The storage/utility system of claim 4, wherein said storage box is provided with at least one shelf therein.

6. The storage/utility system of claim 1, wherein one said storage box is mounted on each side of said bed.

7. The storage/utility system of claim 6, wherein said hinged side panel portions extend substantially an entire length of said bed, are each formed by a pair of vertical cuts in the overall side panels of the bed adjacent ends of the overall side pannels, and are constructed such that when said hinged portion of said side panels are lowered the storage boxes are hidden and the external appearance of the bed is not substantially altered.

8. The storage/utility system of claim 7, wherein said storage boxes in said bed are positioned in excess of four (4) feet from each other.

9. The storage/utility system of claim 8, wherein said bed is mounted on the wheels of a vehicle selected from the group of pickups, trailers, and trucks.

10. A storage/utility system for a bed of a vehicle having side panels on sides thereof, said system comprising:

- a storage box mounted on at least one said side of said bed and having side walls and end walls enclosing an interior;
- a portion of one said side panel on said one side of said bed comprising one said side wall of said storage box and having a horizontal hinge at an upper portion thereof, wherein said side panel portion can be raised about said hinge to expose said interior of said storage box and lowered to cover said interior of said storage box; and
- a lock and a latch mechanism mounted in one said end wall and said side panel portion of said storage box for releasably securing said side panel portion.

11. The storage/utility system of claim 10, wherein said storage box has a height less than a height of said bed.

12. The storage/utility system of claim 10, wherein said latch mechanism includes a plurality of latch members on said side panel portion adapted to cooperate with latch members secured to said one side panel.

13. The storage/utility system of claim 10, wherein said storage box is provided with at least one shelf therein.

14. The storage/utility system of claim 10, wherein said storage box is constructed to cover and extend forward and rearward of a wheel well of said bed.

15. The storage/utility system of claim 10, wherein one said storage box is mounted on each side of said bed.

16. The storage/utility system of claim 15, wherein said storage boxes are mounted in said bed so as to be positioned in excess of four feet from each other.

* * * * *